Sept. 28, 1937.  G. R. TOWN  2,094,196
CENTRIFUGAL GOVERNOR
Filed Aug. 7, 1934   2 Sheets-Sheet 1
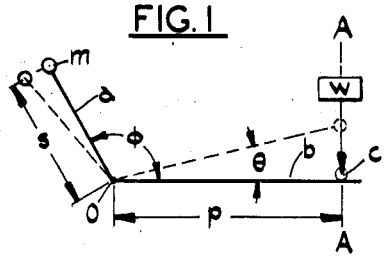
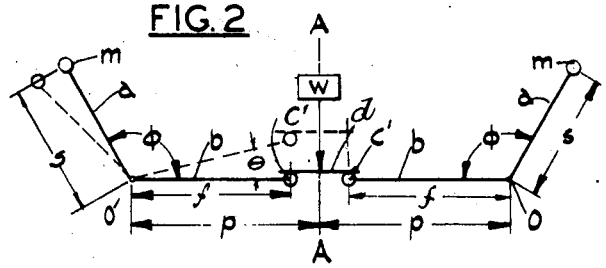
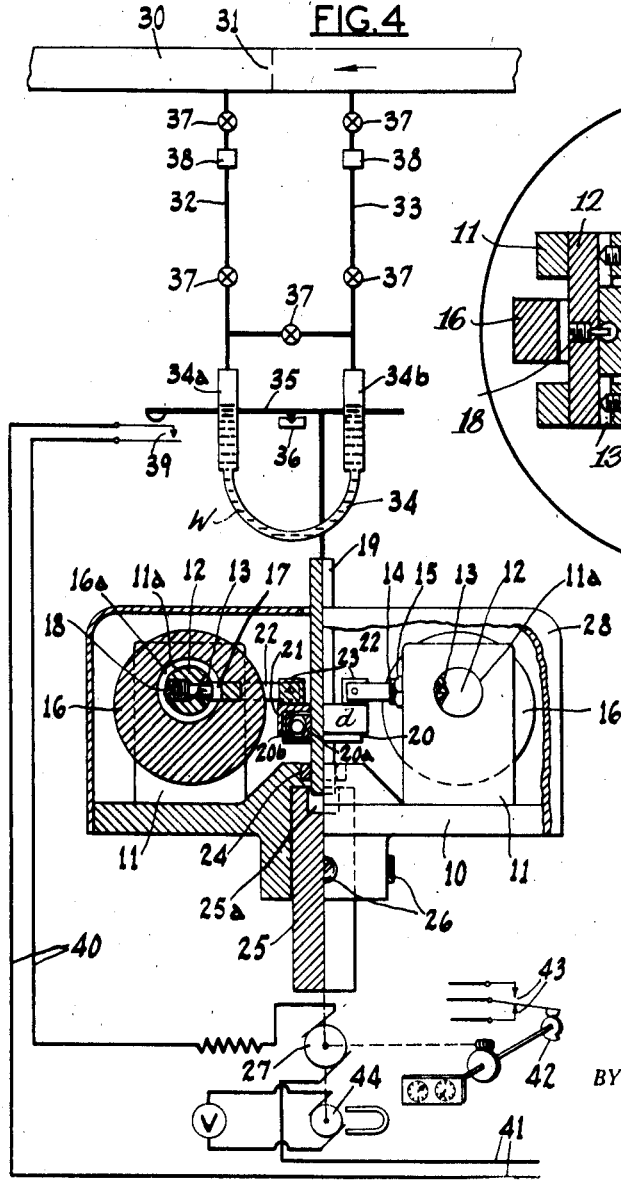
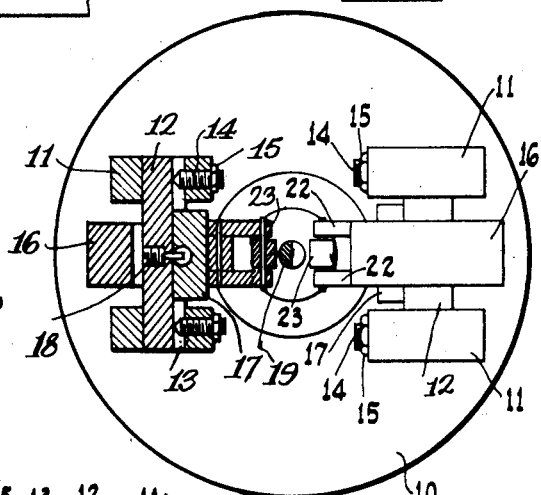
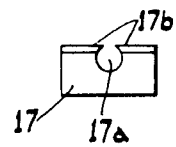
INVENTOR.
GEORGE R. TOWN
BY
ATTORNEY.

Sept. 28, 1937.　　　　　G. R. TOWN　　　　　2,094,196
CENTRIFUGAL GOVERNOR
Filed Aug. 7, 1934　　　　2 Sheets-Sheet 2

INVENTOR.
GEORGE R. TOWN
BY
　Cornelius L. Ehret
　　ATTORNEY.

Patented Sept. 28, 1937

2,094,196

UNITED STATES PATENT OFFICE 2,094,196

CENTRIFUGAL GOVERNOR

George R. Town, Troy, N. Y., assignor to Leeds & Northrup Company, Philadelphia, Pa., corporation of Pennsylvania Application August 7, 1934, Serial No. 738,889

14 Claims. (Cl. 264—15)

My invention relates to centrifugal governors and more particularly to such governors of the gravity or force loaded type which are substantially neutral over an extended range of operation.

The centrifugal governor of my invention comprises a rotatable member including a pivotal support. One or more governor weights are pivoted on the support and cooperate with a control member or arm which controls or regulates the action of the governor or other controlled mechanism. The angle between the pivotal radius of the weight, that is, a radius from its pivotal axis to its center of gravity, and a radius of rotation to the pivotal axis, for the normal position of the control member, is such that the governor is substantially neutral over a range of movements of the governor weights; that is, the rate of change of centrifugal moment of the weight with respect to its deflection about its pivotal axis is equal to the rate of change of the controlling moment with respect to governor deflection over a wide range; preferably, the rates of change are zero for the normal position of the governor weights.

Further, in accordance with my invention, the angle between the pivotal radius and the radius of rotation, and the ratio between the pivotal radius of the weight and the radius of rotation to the pivotal axis are such that the centrifugal moment of the weight about its pivotal axis varies as the cosine of the angle of pivotal deflection. More particularly, the radius of rotation is large compared with the pivotal radius and, by way of example, may be of the order of eight times the pivotal radius.

Further, in accordance with my invention, the control arm or member is a unitary structure with the weight and pivoted therewith about a common axis; it is subjected to a controlling force applied at a predetermined point, so that the moment of this force about the pivotal axis also varies as the cosine of the angle of deflection of the governor weights.

For a better understanding of my invention, together with other and further features thereof, reference is had to the following description taken in connection with the accompanying drawings and its scope will be pointed out in the appended claims.

In the drawings,

Fig. 1, to aid in the explanation of my invention, is a schematic diagram of the essential elements of a centrifugal governor;

Fig. 2 is a schematic diagram of the essential elements of a different type of centrifugal governor, to aid in the explanation of my invention;

Fig. 4 is an elevation, partly in section, of a centrifugal governor embodying my invention, as applied to a system for measuring fluid flow;

Fig. 5 is a plan view of the right half of the governor of Fig. 4 and a sectional plan view of the left half of that governor taken through the knife-edge pivot of the governor weight;

Fig. 6 is a detail of a knife edge bearing utilized in the governor of Figs. 4 and 5;

Figure 7:
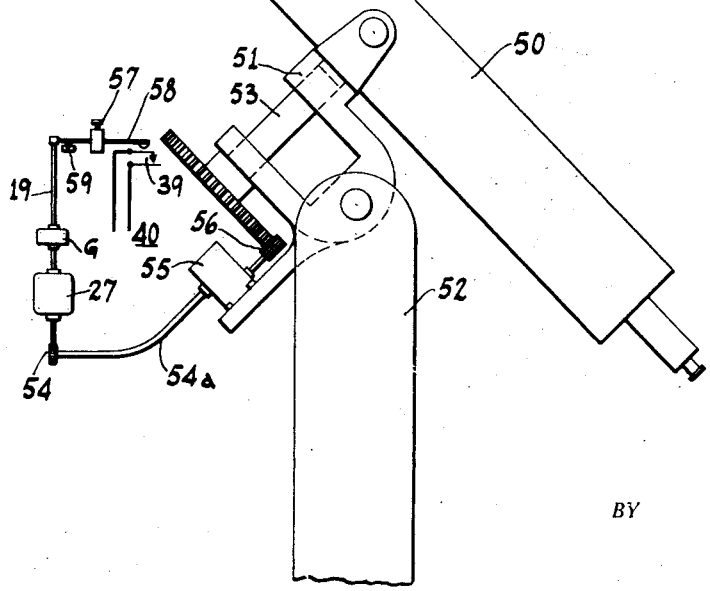

Fig. 7 illustrates the application of my invention to the governing of the speed of drive of an astronomical telescope. Referring to the drawings, my invention will be best understood by first referring to Fig. 2 wherein there is illustrated, schematically, a centrifugal governor of the double arm type, comprising masses $m$ considered as concentrated at points, supported respectively upon arms $a$ pivotally mounted about points $o$ which rotate about the axis A—A. The arms $a$, respectively, have secured thereto as unitary or integral elements, arms $b$ which project from the respective pivots $o$ toward the axis of rotation A—A. The controlling force or weight W, movable along the axis A—A, is applied at the points $c'$ at distances $f$ from the pivots $o$. The aforesaid double arm type of governor facilitates balancing, both statically and dynamically.

The angles between the respective arms $a$ and $b$, which in effect comprise bell cranks, are represented by the angles $\phi$, while the deflections of the masses $m$ and their connected arms from their normal position may be represented by angles $\theta$. The lengths of arms $a$ are represented by symbols $s$; the radial distances between the axis A—A and pivots $o$ are represented by symbols $p$. In this case the moment arm of the controlling force W varies as cosine $\theta$, and for a given constant controlling force the moment $M_f$ of this force also varies as cosine $\theta$. On the other hand, the moment $M_c$ of the centrifugal force about each pivot $o$ varies not only with the speed of rotation of the governor but also with the radius of each mass $m$ about the axis A—A, i. e. with the deflection of the governor.

In the case of centrifugal governors of the gravity type, as shown in Fig. 2, that is, governors subjected to a controlling force independent of the deflection of the governor weights, as contrasted with spring-loaded governors in which the loading force varies with the deflection of the weights and the spring, it is desirable that the force reacting against the controlling force, and due to the moment of the centrifugal force of the weights about their pivots, be a direct function only of the speed of the governor and independent of the deflection of the governor weights.

When this is true, by controlling the driving means of the governor in accordance with its deflection, a predetermined relation may be established between the magnitude of the controlling force and the speed of the governor. Such an arrangement is useful in many mechanical systems, examples of which are described in detail hereinafter.

The above conditions are satisfied, obviously, only when the resultant $M_c$ of the centrifugal moments of the governor weights $m$ about their pivots $o$, is equal and opposite to the moment $M_g$ of the controlling force, at any given speed, for all angles $\theta$ of deflection of the governor weights.

However, for the usual relationship of parts, the centrifugal moment of the governor is not constant for all deflections, but follows a predetermined curve. The moment of the applied force may also be made to follow a predetermined curve, for example, a cosine curve; and, by a proper proportioning of the parts in accordance with my invention, the curve of the centrifugal moment $M_c$, with respect to deflection of the governor weights $m$, may be made to approximate the curve of the moment $M_g$ of the controlling force, so that the centrifugal moment and the moment of the controlling force are substantially equal for all deflections of the governor at a given speed and are independent of the deflection of the governor weights, which imparts to the governor substantially neutral characteristics; that is, characteristics such that the governor remains in equilibrium through a range of movements of its arms $a$. In other words, for a constant governor speed, the variation in the resultant $M_c$, which varies with changes in the centrifugal force developed by the weights $m$ and changes in the lengths of their respective moment arms occasioned by movement of the weights $m$ through a substantial range, is compensated for by a corresponding variation in the opposing moment $M_g$ developed by the controlling force $W$.

The moment of the controlling force is made up of two components, the magnitude of the controlling force $W$ and its lever arm $f \cos \theta$. By applying the force vertically at predetermined points $c'$ of normally horizontal control arms $b$, the lever arms vary as the cosine of the angle $\theta$ of deflection from normal position and the moment of this force, $M_g$, also varies in the same manner. Accordingly the gravity biasing moment $M_g$ may be expressed by the equation $$M_g = WK \cos \theta$$

where K is a constant. Similarly, the centrifugal moment $M_c$ is made up of two components, the centrifugal force $F_c$ and the lever arms $s \sin(\phi+\theta)$ of the centrifugal force about the pivotal axes $o$. The centrifugal force always increases with increase of radial distance from axis of rotation, while the moment arms increase or decrease in accordance with the position of the weights with respect to the position of the control arm. By a proper design and proportioning of parts, the moment or lever arms of the centrifugal weights may be made to vary at such rates with respect to the variations in the centrifugal force with variations in deflections of the weights that the rate of variation of their product $M_c$ is zero for the normal position of the control arm, while this product varies approximately as the cosine of the angle of deflection therefrom. The normal position of the control arm is the one where the centrifugal moment is a maximum for a given speed of rotation. By causing the moment of the applied force to vary also as the cosine of the angle $\theta$ of deflection, as described above, the required applied force i. e. that required to balance the centrifugal force with varying governor speeds will vary precisely with the square of the speed of the governor over an extensive range of deflection, thereby substantially increasing the accuracy of the governor.

In order to secure neutral characteristics two considerations become important: First, the curves of the centrifugal moment $M_c$ and the controlling moment $M_g$ with respect to $\theta$ must be tangent at the normal position of the governor, which usually corresponds to $\theta=$zero; and further the curve of the centrifugal moment $M_c$ with respect to $\theta$ must coincide with or approximate the curve of the controlling moment $M_g$ with respect to $\theta$, i. e. the cosine curve. If both of these conditions are satisfied, the axial force opposing W will be dependent only on speed, and will be independent of the deflection $\theta$ of the governor.

The first of the above considerations is satisfied if the curves of $M_c$ and $M_g$ with respect to $\theta$ are tangent or have the same slope for the normal position of the governor, that is for $\theta=0$. From an inspection of Fig. 2 it is clear that:

$$M_c = \frac{2m\omega^2}{g}[p - s \cos(\theta+\phi)]s \sin(\theta+\phi) \quad (1)$$

where $\omega$ is the angular velocity of the governor in radians per second and $g$ is the acceleration of gravity; and $$M_g = Wf \cos \theta \quad (2)$$

If the slopes of $M_c$ and $M_g$ are equal at $\theta=0$:

$$\frac{dM_c}{d\theta} = \frac{dM_g}{d\theta} \quad (3)$$

$$\frac{2m\omega^2}{g}\{[p - s \cos(\theta+\phi)][s \cos(\theta+\phi)] + s^2 \sin^2(\theta+\phi)\} = -Wf \sin \theta \quad (4)$$

Simplifying and equating $\theta$ to 0 gives:

$$2s \cos^2 \phi - p \cos \phi - s = 0 \quad (5)$$

$$\cos \phi = \frac{p \pm \sqrt{p^2 + 8s^2}}{4s} \quad (6)$$

Since the slope of $M_c$ at $\theta=0$ is zero, it is evident that, as the radius of rotation of the mass increases, its lever arm must decrease; therefore $\phi$ must have a value between 90 and 180 degrees; that is the cosine is negative and:

$$\cos \phi = \frac{p - \sqrt{p^2 + 8s^2}}{4s} \quad (7)$$

If the relationship of Equation (7) is satisfied, the governor will be neutral at $\theta=0$ but not necessarily for any other position. In order to extend the range of neutrality, it is necessary that the curve $M_c$ should coincide with or approximate the curve $M_g$ over the desired range of operation. Equating (1) and (2) to fulfill this condition:

$$Wf \cos \theta = \frac{2m\omega^2}{g}[p - s \cos(\theta+\phi)]s \sin(\theta+\phi) \quad (8)$$

Since the governor is neutral at θ=0 as determined above, from (8) is obtained:

$$Wf = \frac{2m\omega^2}{g}(p - s\cos\phi)s\sin\phi \quad (9)$$

Substituting (9) in (8) and simplifying gives:

$$s = \frac{2p\cos\phi\sin\theta}{\sin 2(\phi+\theta) - \sin 2\phi\cos\theta} \quad (10)$$

It can be shown that this last expression is satisfied only when $\phi=90°$ and the ratio $p/s$ is infinite.

However, the above relationship may be approximated and the governor made substantially neutral over a considerable range by making the ratio $p/s$ large. For example, I have found that, with a ratio $p/s$ of 8 or greater, the deviation of $M_c$ from $M_g$ is less than 0.1% over a range of deflection of the governor of 35°. In the preferred embodiment of my invention I utilize the ratio $p/s$ of approximately 8.

Figure 3:
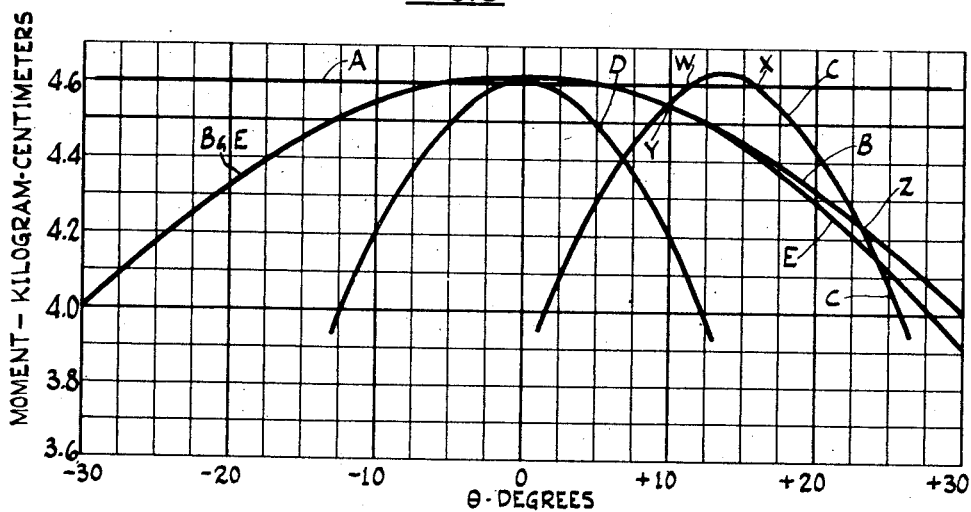
Fig. 3 illustrates characteristic curves of moment plotted against degrees of governor deflection as abscissae of governors of the prior art and of governors constructed in accordance with my invention.

In Fig. 3 are shown curves representing the conditions discussed above for one particular speed. Since in accordance with my invention the moments $M_c$ and $M_g$ vary equally in sense and in magnitude for different deflections of the weights $m$, it is convenient to plot moments as ordinates against the deflection of the weights $m$, measured in degrees of deflection of the weights from their normal positions as abscissae. (The normal positions of the respective weights $m$ are those positions which produce a maximum resultant moment $M_c$ for any given speed.)

The maximum ordinate of curve B, representing the moment $M_g$ of the controlling force, occurs at a value of θ=0. If the weights $m$ be deflected in either direction (without change in speed of arms $b$) from the neutral positions, shown in Fig. 2, the controlling moment $M_g$ decreases in accordance with decrease in the value of $\cos\theta$.

In case the governor is proportioned in accordance with Equation (7) its characteristics are represented by curve D of Fig. 3 which is tangent to curve B for the normal position of the governor, at which θ=0, but is much more peaked, i. e. diverges rapidly from curve B on both sides of the normal governor position. Such a governor is neutral only in the immediate neighborhood of θ=0. If such a governor is utilized to control the speed of the motor driving the governor, an error will be introduced into the speed regulation for those positions of the governor outside of the aforesaid neighborhood of θ=0.

Curve E represents the centrifugal moment of an actual centrifugal governor constructed in accordance with my invention and proportioned as determined by the above equations and constructed as described hereinafter; specifically with a ratio $p/s=8$. It is seen that, on the left hand side of Fig. 3, the curve E is substantially coincident with curve B. Over a range of from −25° to +10° the maximum deviation between curves B and E is less than 0.1%. While the angle θ has been considered as the deflection of the governor from its normal position, in this specific example the position of the governor corresponding to the midpoint in the range of minimum error is preferably utilized as the normal position, in the above case at θ=−7½°, to provide an equal range on opposite sides of normal with the same minimum error.

The curve A represents the application of a constant controlling moment $M_g$ to a governor of the type shown in Fig. 1 wherein the weight W is applied to a single arm $b$ by means of a roller $c$ or the like. Since the weight acts along the axis A—A on the roller $c$, the distance $p$ between that axis and the pivot $o$ remains constant irrespective of deflection of the weight $m$. As in the case of Fig. 2, the arm $a$ bears a fixed angular relationship with respect to the arm $b$ indicated by the angle $\phi$. By proportioning the parts in accordance with Equation Number (7) and with a ratio of $p$ to $s$ of the order of 8, the curve E represents the centrifugal moment $M_c$. It is seen also that curve E closely approximates curve A in the neighborhood of θ=0; within a range of ±2½° the deviation between curves A and E does not exceed 0.1%. That is, even with a control mechanism of the type illustrated in Fig. 1, in which the controlling moment $M_g$ is constant, approximate neutrality may be secured by proportioning the governor in accordance with the foregoing formulae.

Contrasted with the foregoing is curve C representing the centrifugal moment $M_c$ of a governor when not constructed in accordance with my invention. It is seen that $M_c$ and $M_g$ are equal only at the two points W and X.

In the foregoing discussion it was assumed that the centrifugal weights $m$ were point masses and the masses of the bell cranks were disregarded. However, I have determined that a mass of uniform density and thickness with a cross-section having axes of symmetry parallel to the axis of rotation and a radius of rotation of the mass, and disposed with its axis normal to both of these directions, is the equivalent of a point mass concentrated at its center of gravity. Best known examples of such masses are solids of revolution such as spheres, cylinders and the like, whose centers of gravity lie on their axes of revolution and I utilize in the preferred embodiment of my invention masses in the form of circular cylinders.

The mechanical structure and physical characteristics of the governor embodying my invention are best shown in Figs. 4 and 5 of the drawings which illustrate an embodiment of my improved governor in a system for measuring fluid flow. Referring more particularly to Figures 4 and 5, there is provided a rotatable plate or support 10 from which project two pairs of upstanding posts or arms 11. Between each pair of posts 11 is supported a cylindrical bearing block 12 mounted in recesses 11a of the posts 11 and provided with a V-notch bearing recess 13. The bearing blocks 12 are retained in position by means of set screws 14 and suitable lock-nuts 15.

Since the centrifugal moment of the governor depends in part upon the mass of the governor weights, and since, for approximate neutrality, the pivotal radius is small for a satisfactory radius of rotation, the problem arises of procuring a governor weight of considerable mass mounted with a short pivotal radius. If mounted in the conventional manner, the radius of the solid of revolution must be less than the pivotal radius, which would require an excessive longitudinal dimension for a reasonable mass. I have solved this problem, however, by utilizing governor weights 16 in the form of cylindrical disks of considerable radius and pivoted, respectively, within their peripheries but eccentrically; thus considerably reducing, for a given mass, their longitudinal dimension. These disks 16 are supported from the bearing blocks 12 and are provided with eccentric bores or openings 16a considerably larger than the bearing blocks 12 to provide a limited freedom of movement of the weights 16 about the bearings 12. Secured within the disks 16 are the knife edges 17 shown in detail in Fig. 6. These knife edges rest in the V-notch bearings 13, 13 of the bearing blocks 12 and serve pivotally and eccentrically to support the disks 16. The knife edges 17 are provided with apertures or openings 17a with which cooperate set screws 18 mounted in the bearing blocks 12 which serve to center the governor disks 16 upon the bearing blocks 12. The openings 17a are preferably circular, as indicated in Fig. 6, terminating in point-like stops 17b which engage the set screws 18 and minimize friction at these points. It has been found that the centers of gravity of such discs lie substantially on their geometric axes.

The controlling force W, referred to in connection with Fig. 2 and here developed by a tilting manometer 34, is applied to the governor by means of a rod 19 secured to the inner plate 20a of a ball, radial, and/or thrust bearing 20, the outer plate 20b of which supports a bearing block 21. Each of the governor disks 16 is provided with a pair of inwardly extending control arms 22, corresponding to arms b of Fig. 2, between the ends of each pair of which is pivotally supported a block 23 bearing upon the block 21 and effective to transmit as a crank arm the centrifugal force developed by the governor disks 16 to the control rod 19. The arms 22 are connected to the disk-weights 16 in a manner such that a line, representing the radius of weight 16 and corresponding to left-hand arm a of Fig. 2, extending from the knife-edge pivot (corresponding to pivot o of Fig. 2) to the center of gravity of the disk 16 lies at an angle θ with respect to a line extending from the knife-edge pivot to the point on arm 22 at which the bias is applied from the manometer 34. The cosine of the angle θ conforms to the requirements of Equation (7). The distance p is of course measured from the knife-edge pivot to the axis of rotation, or to the axis of rod 19 which coincides with the axis of rotation. The lower end of the rod 19, which is axially movable but non-rotatable, is journalled in a bearing 24 supported in the base 10 to maintain proper alignment. This end of the rod 19 may move in a recess 25a of a vertical support 25 upon which the base 10 is supported and secured by means of suitable set screws 26. The support 25 may be rotated by any suitable type of motor such as an electric motor 27. The governor mechanism, per se, is preferably encased within a shell or housing 28.

In the system illustrated the governor is adapted to measure the fluid flow in a conduit 30 provided with a device for producing a differential pressure representative of the fluid flow through the conduit, such as an orifice 31. The pressures on opposite sides of the orifice 31 are transmitted through the pipes 32 and 33 to the arms 34a and 34b of the tilting manometer 34 secured to a frame 35 mounted on a knife edge and bearing block 36. Suitable shut-off and equalizing valves 37 are included in the pipes 32 and 33 for calibrating the manometer and placing it in and out of service, as well understood by those skilled in the art; also condensers 38 may be included in the lines 32 and 33.

The frame 35 actuates contacts 39 connected to control or regulate, in any well known manner, the speed of the motor 27. For example, the contacts 39 may be included in the circuit 40 of the motor 27, which may be energized from any suitable supply circuit 41, either direct or alternating current in accordance with the type of motor employed. Connected to the motor 27 is suitable counting mechanism 42 connected to actuate contacts 43, in case it is desired to transmit to a distant point the revolutions of the motor 27.

In the operation of the above described system, it will be assumed that, at a given instant, the contacts 39 are open, as illustrated, that the motor has been previously energized and is coasting, and that fluid is flowing in the conduit 30. Flow of fluid in the conduit 30 produces a differential pressure across the orifice 31 which is impressed upon the arms of the tilting manometer 34 and displaces the liquid, preferably mercury, from one arm, as 34b into the other arm, as 34a, causing an unbalance and tilting of the manometer and frame 35. The unbalance force, due to the difference in the weights of the columns of liquids in the two arms of the manometer 34, produces an upward pull on the rod 19 which pull or force is transmitted to the control arms 22 of the centrifugal weights or disks 16. In case the speed of the motor 27 is insufficient to produce, by means of the disks 16 an adequate force on the bearing block 21 to balance the control force exerted by the rod 19, the rod 19 will move upwardly and the frame 35 will be effective to close the contacts 39, energizing the motor circuit and increasing the speed of the motor and the governor. This increase in speed will continue until the moment of the centrifugal force developed by the weights 16 predominates over the moment of the control force for the existing fluid flow through the conduit 30, when the control rod 19 will be moved downwardly breaking the circuit of the motor 27 at the contacts 39 and allowing the motor to slow down. The making and breaking of the contacts 39 is relatively rapid so that the deviation of the speed of the motor 27 from its mean value is insubstantial or negligible, this mean speed being determined by the balancing of the moment of the centrifugal force of the weights 16 and that of the control force exerted by the tilting manometer.

It is well understood in the art that the differential pressure developed across an obstruction such as the orifice 31 is proportional to the square of the rate of flow of fluid passing the orifice. It is also well known that the centrifugal force developed by a rotating mass is proportional to the square of the speed of rotation. By balancing these two forces, each proportional to the square of the primary condition, a linear relation is established between the rate of flow of fluid in the conduit 30 and the speed of rotation of the motor 27 so that the speed of rotation of the motor 27 is a direct and linear measure of the flow of fluid in the conduit 30; and moreover the number of revolutions of the motor 27 is a direct and linear measure of the total quantity of fluid passing the orifice 31. By attaching a counter 42 and a tachometer 44 to the motor 27, both the rate of flow and the total flow may be continuously indicated and/or recorded, as desired. Similarly, by actuating contacts 43 by the counter 42, the revolutions of the motor 27 may be transmitted to any remote point at which either the speed of rotation or the total number of revolutions or both may be indicated or recorded.

In order that the above described system may be useful in measuring the flow of fluid or in measuring other similar quantities from which a controlling force may be derived, it is necessary that the speed of the motor 27 be accurately governed or controlled to correspond closely to the magnitude of the controlling force. As pointed out above, the force developed by the weights 16 and applied to rod 19 is a function of speed only, if the governor is proportioned in accordance with the formulae derived above. In all other cases the force will be dependent also upon a factor including the deflection of the governor disks from their normal position, so that for a change in manometer unbalance, due to a change in the rate of flow, the required change in the speed of the governor to procure rebalance is not a linear function of the aforesaid changed rate of flow. However, by proportioning the several governor parts in accordance with the formulae derived above, the force varies as the square of the speed of rotation; it is completely independent of the deflection of the governor weights throughout a considerable range on either side of the normal position of the governor; the speed of the governor, varied by changes in the controlling force W, becomes an accurate measure of the rate of flow of fluid through pipe or conduit 30. For example, with the parts in the position shown in Fig. 4, a large increase in rate of flow through the conduit 30 would cause the fluid to rise in manometer arm 34a; the resulting increase in the unbalanced force acts to move rod 19 upwardly and to deflect or rotate the respective disks 16. Thus the deflection of the disks 16 from their neutral position may be great. The switch 39, closed as soon as the weight or disks 16 move a predetermined amount, energizes the motor 27. The increasing speed of rotation increases the centrifugal moment $M_c$ which, as soon as it exceeds the controlling moment $M_g$, returns weights or disks 16, the rod 19 and the switch 39 toward their original positions. As before, the switch 39 opens its contacts, the speed decreases, the weights deflect to close the switch and the action is repeated accurately to maintain the governor speed in its proportional or linear relation to the rate of flow. As stated above, the centrifugal moment $M_c$ and the controlling moment $M_g$ (curves E and B Fig. 3) vary in the same sense and to the same extent with deflection of the disks 16 so that the speed regulation is independent of variables introduced because of change in the position of the disks or their associated arms; in other words, the governor is neutral over a wide range of deflections. In this connection it is to be pointed out that it is not any specific dimension of the governor, such as the radius of rotation of the governor weights or their pivotal radius, but the proportioning of the several constants of the governor in accordance with the above equations, which imparts to the governor its neutral characteristics. In general the governor weights are free to deflect throughout their wide range or angle of deflection in response to the predominant one of the centrifugal or gravity biasing moments until the other moment predominates. These moments, as already shown, may be expressed approximately by the equations $$M_c = F_c k \cos \theta$$
$$M_g = WK \cos \theta$$

where $F_c$ is the centrifugal force; $k$, $K$ are constants; $W$ is the gravity biasing force and $\theta$ as before is the angle of deflection of the governor weights from a position where the centrifugal moment $M_c$ and the gravity biasing moment $M_g$ for a given speed have their maximum values.

It is therefore clear that the deflection of the governor weights throughout the wide angle of at least thirty-five degrees is dependent only upon the predominate one of the centrifugal or gravity biasing forces. The deflection of the governor weights is not affected by the change in the moment arms associated with either of the aforesaid forces $F_c$ and W since, as shown by curves B and E of Fig. 3 for a given speed, the moments $M_c$ and $M_g$ change in the same sense and by equal amounts throughout the neutral range of the governor, or for all positions of the governor weights within the wide angle.

In Fig. 7 there is illustrated an application of my invention to the driving at constant speed of an astronomical telescope. Such an application is particularly advantageous in remote observatories where sources of alternating current of accurately controlled frequency are usually unavailable. In this instance an astronomical telescope 50 is supported in a yoke 51 pivotally mounted on a pedestal 52. Telescope 50 is attached to a shaft 53 by which it is driven, while the shaft 53 is rotated by a governor controlled motor 27 through suitable gearing 54, a flexible shaft 54a, gear box 55 and gearing 56. In this instance the constant controlling force applied to the control rod 19 of the governor G is supplied by a weight 57, adjustably secured to a beam 58 fulcrumed on a knife edge 59. As in the arrangement of Fig. 4 the beam 58 controls contacts 39 in the energizing circuit 40 of the motor 27. The operation of the apparatus of Fig. 7 is in all respects similar to that of Fig. 4 with the exception that the controlling force impressed by the weight 57 is constant in magnitude, so that the speed of the governor G and the motor 27 is maintained at a constant value to balance the centrifugal force of the governor against the controlling force. Because of the extremely high accuracy of the governing apparatus G when constructed in accordance with my invention, the telescope 50 may be maintained in accurate alignment on a particular point or region under observation.

While I have described what I at present consider the preferred embodiment of my invention, it will be apparent to those skilled in the art that various changes and modifications may be made without departing from the spirit of my invention, and I therefore aim, in the appended claims, to cover all such changes and modifications as fall within the true spirit and scope of my invention.

What I claim is:

1. A centrifugal governor having neutral characteristics for a wide range of governor-weight positions comprising a rotatable member including a pivotal support having its pivotal axis displaced from the axis of rotation by a distance $p$, a deflecting weight pivoted on said support with a pivotal radius $s$ not greater than one-eighth $p$ and extending from the center of gravity of said weight to said pivotal axis, gravity biasing means including a member movable by deflection of said weight, and a control arm extending at an angle $\theta$ from said weight, one end of said arm being rigidly secured to said weight and the opposite end of which receives at a point, the bias of said gravity biasing means, said angle $\theta$ being measured between a line connecting said pivotal axis and the center of gravity of said weight and a line connecting said pivotal axis and said point on said arm, and said angle being determined by the relation $$\cos \phi = \frac{p - \sqrt{p^2 + 8s^2}}{4s}$$

2. The combination with a motor and means operable from one position to another for controlling the speed of rotation of said motor, of a governor having at least one deflecting weight driven by said motor, a supporting member including a pivotal support for said weight having its pivotal axis displaced from the axis of rotation by a distance $p$, said deflecting weight pivoted on said support with a pivotal radius $s$ not greater than one-eighth $p$ and extending from the center of gravity of said weight to said pivotal axis, and a control member rigidly secured to said weight at an angle $\theta$ with respect to said radius $s$, said angle $\theta$ being determined by the relation $$\cos \phi = \frac{p - \sqrt{p^2 + 8s^2}}{4s}$$

and means operable by deflection of said weight for actuating said control means.

3. A centrifugal governor comprising a rotatable member including a pivotal support displaced from the axis of rotation of said member, a weight pivoted on said support for deflection at a given radius from its pivotal axis through a large angle, a control arm having one end rigidly secured to said weight, gravity means for applying a biasing moment at a given point to the opposite end of said arm, the magnitude of said moment varying as the cosine of the angle of deflection of said weight from a position where said moment is a maximum, the angle between the radius of said weight and a line connecting said pivotal axis and the point of application of said gravity biasing moment to said arm being so proportioned that the centrifugal moment of said weight about its pivotal axis varies approximately proportionally with the cosine of the angle of pivotal deflection of said weight through said large angle of deflection thereby to impart neutral characteristics to the governor for every deflection within said large angle.

4. A governor comprising a deflecting weight movable by centrifugal force about a pivotal axis in response to change of speed, a control arm operatively associated with said weight and movable therewith, means mounting said weight and said arm for rotation about a given axis the distance of said pivot from said axis of rotation being of the order of eight times the length of a line connecting the center of gravity of said weight and its pivotal axis, gravity operated biasing means for applying an opposing moment to said control arm which varies in accord with the cosine of the angle of pivotal deflection of said weight, and the angle between said arm and said connecting line being selected to produce, through a substantial range of deflections of said weight on opposite sides of a position of said weight at which the moments of centrifugal force and of said gravity biasing means are equal and have their maximum values, simultaneous variation of said centrifugal moment in the same sense and by amounts equal to those of said gravity biasing moment whereby for a given speed and a given bias said weight is free to deflect throughout said range without disturbing the equality between said moments.

5. A centrifugal governor comprising a rotatable member including a pivotal support displaced from the axis of rotation of said member, a weight pivoted on said support for deflection at a given radius from its pivotal axis, a control arm having one end rigidly secured to said weight, gravity means for applying at a given point a biasing moment to the opposite end of said arm varying as the cosine of the angle of deflection of said weight from a position where said biasing moment is a maximum, the angle between the radius of said weight and a line connecting said pivotal axis and the point of application of said gravity biasing moment to said arm being so proportioned that the centrifugal moment of said weight about its pivotal axis varies approximately proportionally with the cosine of the angle of pivotal deflection of said weight through a wide range of angles of deflection thereby to impart neutral characteristics to the governor over said wide range of said angles of deflection, and means movable in accordance with deflections of said weight for controlling the speed of rotation of said weight.

6. A governor comprising a deflecting weight having a pivotal radius $s$, means mounting said weight for rotation about an axis displaced from the pivot of said weight by a radius $p$, a control arm disposed in a fixed angular position with respect to said pivotal radius and deflecting with deflection of said weight, the angle $\phi$ between said pivotal radius $s$ and said control arm being determined by the relation $$\cos \phi = \frac{p - \sqrt{p^2 + 8s^2}}{4s}$$

and the ratio of $p$ to $s$ being at least 8, and gravity biasing means applied to said arm, the resulting moment varying as the cosine of the angle of deflection of said weight, thereby to impart neutral characteristics to the governor over a wide range of deflections of said weight.

7. A centrifugal governor having neutral characteristics throughout a wide range of deflections of the governor-weights comprising a rotatable member including a pivotal support, at least one deflecting weight comprising a solid of revolution pivoted on said support with the axis of revolution of the generatrix of the solid of revolution parallel to its pivotal axis, the radius of rotation $p$ from the axis of rotation to said pivotal axis being of the order of eight times the pivotal radius $s$ of said weight, a control arm rigidly secured at one end to said weight, said pivotal radius $s$ being disposed at an angle $\phi$ from a line extending between the free end of said arm to said pivotal axis, the cosine of said angle $\phi$ having a value determined by the relation $$\cos \phi = \frac{p - \sqrt{p^2 + 8s^2}}{4s}$$

so that the centrifugal moment of the weight about its pivotal axis varies approximately proportionally with the cosine of the angle of pivotal deflection of said weight from a position where for a given speed said centrifugal moment is a maximum, and gravity biasing means engaging said free end of said arm for applying an opposing moment thereto variable with said cosine of said angle of pivotal deflection.

8. A centrifugal governor having neutral characteristics throughout a wide angle of deflection of the governor-weights comprising a rotatable member including a pivotal support having its pivotal axis displaced from the axis of rotation by a distance $p$, at least one deflecting weight comprising a cylinder pivoted on said support with a pivotal radius $s$ not greater than one-eighth $p$, a control member rigidly secured to said weight at an angle with respect to said radius $s$ such that the centrifugal moment $M_c$ of said weight is proportional to the relation $F_c \cos \theta$ where $F_c$ is the centrifugal force developed by said weight, and $\theta$ is the pivotal deflection of said weight from a position where for a given speed $M_c$ is a maximum, means including a gravity biasing means for applying to said control member a controlling moment $M_g$ proportional to the relation $W \cos \theta$ where $W$ is the force developed by said gravity biasing means.

9. A centrifugal governor comprising a rotatable member including a pivotal support displaced from the axis of rotation of said member, a weight pivoted on said support for deflection at a given radius from its pivotal axis, a control arm having one end rigidly secured to said weight, gravity biasing means for applying at a given point on the opposite end of said arm a gravity biasing moment which varies as the cosine of the angle of deflection of said weight, the ratio between the length of said radius and the distance of said pivotal axis from said axis of rotation, and the angle between the radius of said weight and a line connecting said pivotal axis and the point of application of said gravity bias to said arm being such that the centrifugal moment of said weight about its pivotal axis and said gravity biasing moment vary in the same sense and by equal amounts for all deflections of said weight within a twenty-five-degree zone on one side, and a ten-degree zone on the other side, of the position of said control arm at which said moments for a given speed have their maximum values.

10. In a centrifugal governor, having a deflecting weight with a radius $s$ extending from a pivotal axis and an arm disposed in a fixed angular position with respect to said pivotal radius and deflecting with said weight, the combination with a control member operable by centrifugal force transmitted thereto by said arm, and the angle between said arm and said radius being such that over a wide range of deflections of said weight the centrifugal force applied to said control member is proportional only to the square of the speed of rotation of said weight and independent of the position of said weight within said wide range of deflections.

11. A centrifugal governor substantially neutral for an extended range of operation comprising a rotatable member including a pivotal support having its pivotal axis displaced from the axis of rotation by a distance $p$, a weight pivoted on said support with a pivotal radius $s$, and a control member rigidly secured to said weight, the angle $\theta$ between the pivotal radius of said weight and said member being determined by the relation $$\cos \phi = \frac{p - \sqrt{p^2 + 8s^2}}{4s}$$

and the ratio $p/s$ being such that the centrifugal moment $M_c$ of said weight about its pivotal axis is expressed approximately by the relation $M_c = F_c \, k \cos \theta$ where $F_c$ is the centrifugal force, $\theta$ is the pivotal deflection of said weight from a position where $M_c$ is a maximum and $k$ is a constant, and means including said control member for developing an opposing gravitational moment $M_g$ which varies with said $\cos \theta$.

12. A centrifugal governor substantially neutral for an extended range of operation comrising a rotatable member including a pivotal support having its pivotal axis displaced from the axis of rotation by a distance $p$, a weight comprising a cylindrical disk pivoted on said support near its center but displaced therefrom by a distance $s$ which is small relative to the distance $p$, a normally horizontal arm secured to said disk and projecting therefrom in a line intersecting its pivotal axis, the angle $\phi$ between the pivotal radius of said weight and said control arm being expressed by the relation $$\cos \phi = \frac{p - \sqrt{p^2 + 8s^2}}{4s}$$

and the ratio $p/s$ being such that the centrifugal moment $M_c$ of said weight about its pivotal axis is expressed approximately by the relation $M_c = F_c \, k \cos \theta$ where $F_c$ is the centrifugal force, $\theta$ is the pivotal deflection of said arm from a position where $M_c$ is a maximum and $k$ is a constant, and control means for subjecting said arm to a controlling force at a predetermined point near its outer end, the moment of said controlling force varying with said $\cos \theta$.

13. The combination with a motor and means for controlling the speed of rotation of said motor, of a governor driven by said motor and having at least one deflecting weight, a supporting member including a pivotal support for said weight having its pivotal axis displaced from the axis of rotation thereof by a distance at least eight times its radius as measured from said pivotal axis to the center of gravity of said weight, a control arm secured to said weight at an angle to said radius such that the centrifugal moment through a wide angle of deflection of said weight about said pivotal axis varies as the cosine of the angle of deflection of said weight from a position where said centrifugal moment is a maximum, gravity biasing means for applying to the opposite end of said arm an opposing moment which varies as the cosine of the angle of deflection so that said weight within said wide angle is free to deflect independently of the angular position thereof, and means operable by said weight for operating said control means.

14. In combination, a centrifugal governor comprising a deflecting weight rotatable about an axis and movable about a pivotal axis through a wide angle, driving means for rotating said weight about its axis of rotation to develop a centrifugal force tending to deflect said weight about its pivotal axis, a control arm secured to said weight in a fixed angular position, the ratio of the length of the pivotal radius of said weight to the distance between said axes, and the angle between said radius and said control arm, being such that the centrifugal moment of said weight about its pivotal axis is proportional to the cosine of the angle of deflection of said weight from a position where said centrifugal moment is a maximum, gravity biasing means, means associated with said biasing means for applying to said control arm a gravity biasing moment which varies as the cosine of said angle of deflection of said weight so that said weight is free to deflect under the influence of the predominant one of said moments until the other of said moments predominates, and means operable by deflection of said weight to control said driving means substantially to maintain said centrifugal moment equal to said biasing moment irrespective of the position of said weight within said wide angle.

GEORGE R. TOWN.

Certificate of Correction

Patent No. 2,094,196.                                                                              September 28, 1937

GEORGE R. TOWN

It is hereby certified that errors appear in the printed specification of the above numbered patent requiring correction as follows: Page 2, second column, lines 46–47, for $$\text{``}\frac{dM_e}{d\Theta} - \frac{dMg}{d\Theta}\text{''}$$

read $$\frac{dM_e}{d\theta} = \frac{dM_\phi}{d\theta} \text{ ;}$$

page 4, first column, lines 37 and 40, and page 7, first column, line 59, claim 11, for "Θ" read $\phi$; page 5, second column, lines 69 and 73, claim 1, and page 6, first column, lines 18 and 19, claim 2, for "$\theta$" read $\phi$; page 7, first column, line 75, claim 12, for "comrising" read *comprising*; and that the said Letters Patent should be read with these corrections therein that the same may conform to the record of the case in the Patent Office.

Signed and sealed this 16th day of November, A. D. 1937.

[SEAL]

HENRY VAN ARSDALE,
*Acting Commissioner of Patents.*